July 22, 1969  J. M. SCHNEIDER  3,456,296
APPARATUS FOR MOULDING ARTICLES FROM PLASTIC MATERIAL
Filed Aug. 16, 1966  6 Sheets-Sheet 4
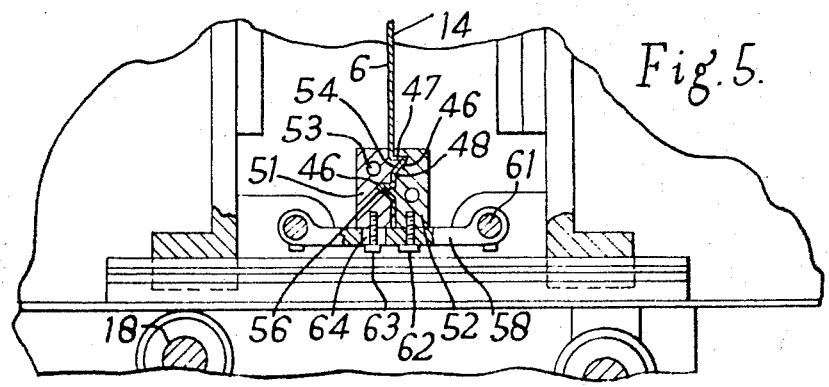
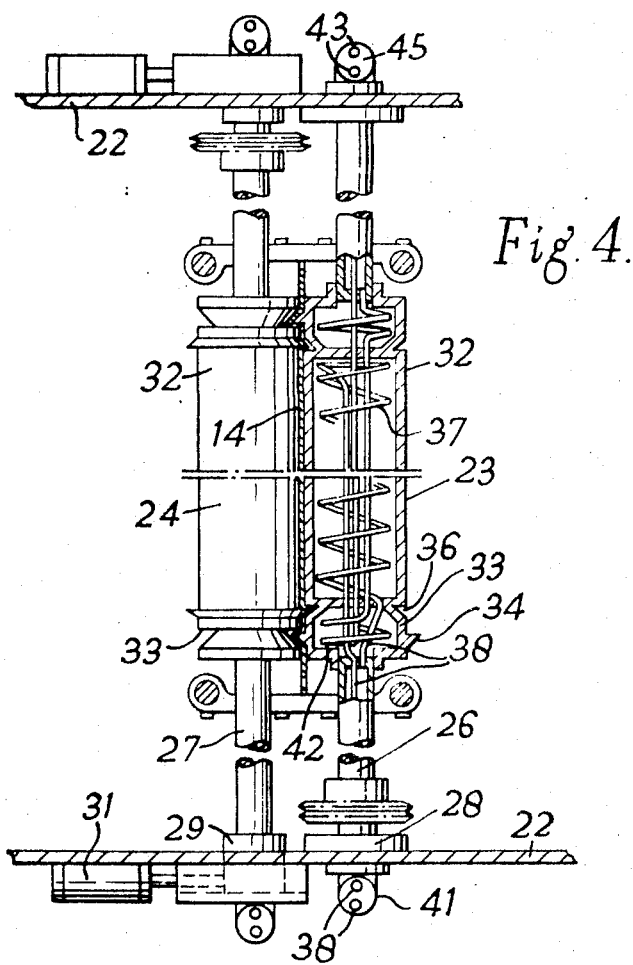

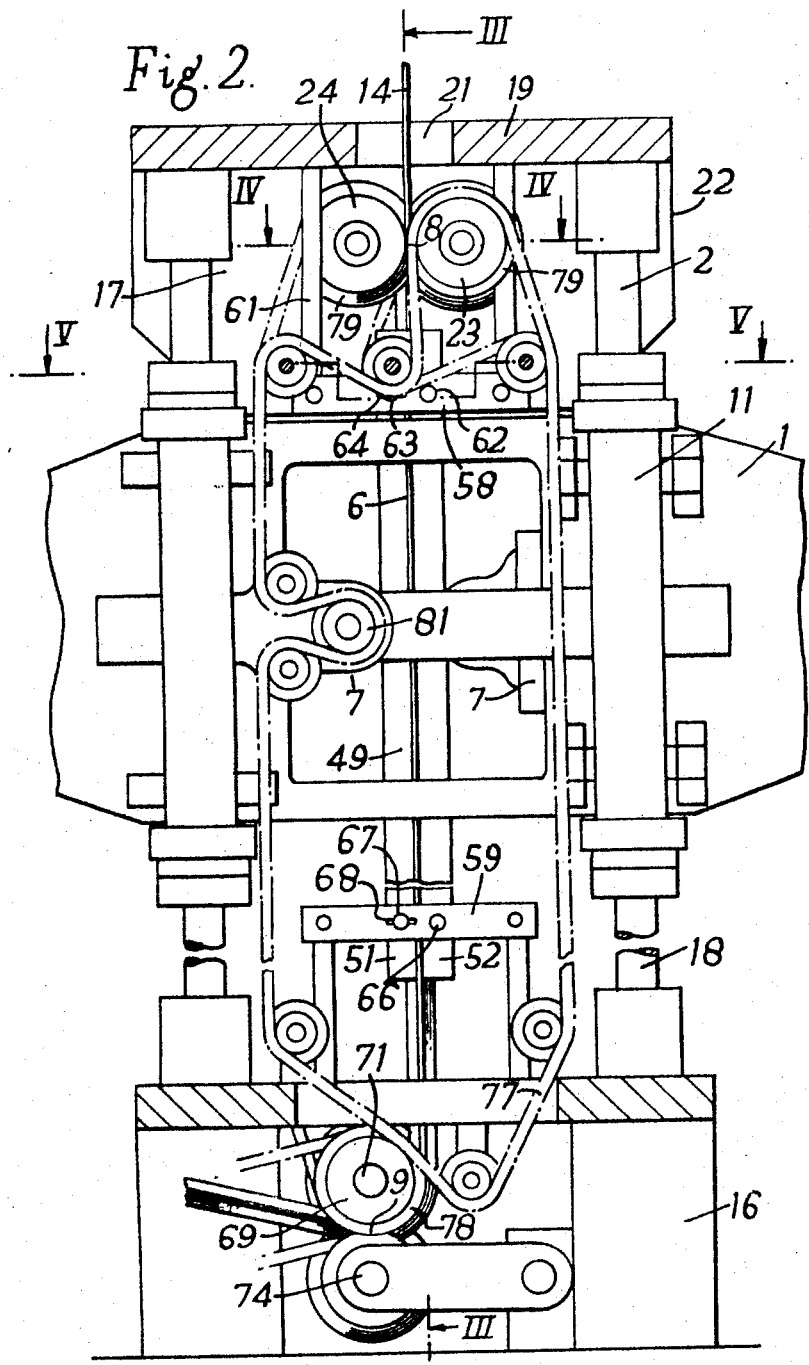

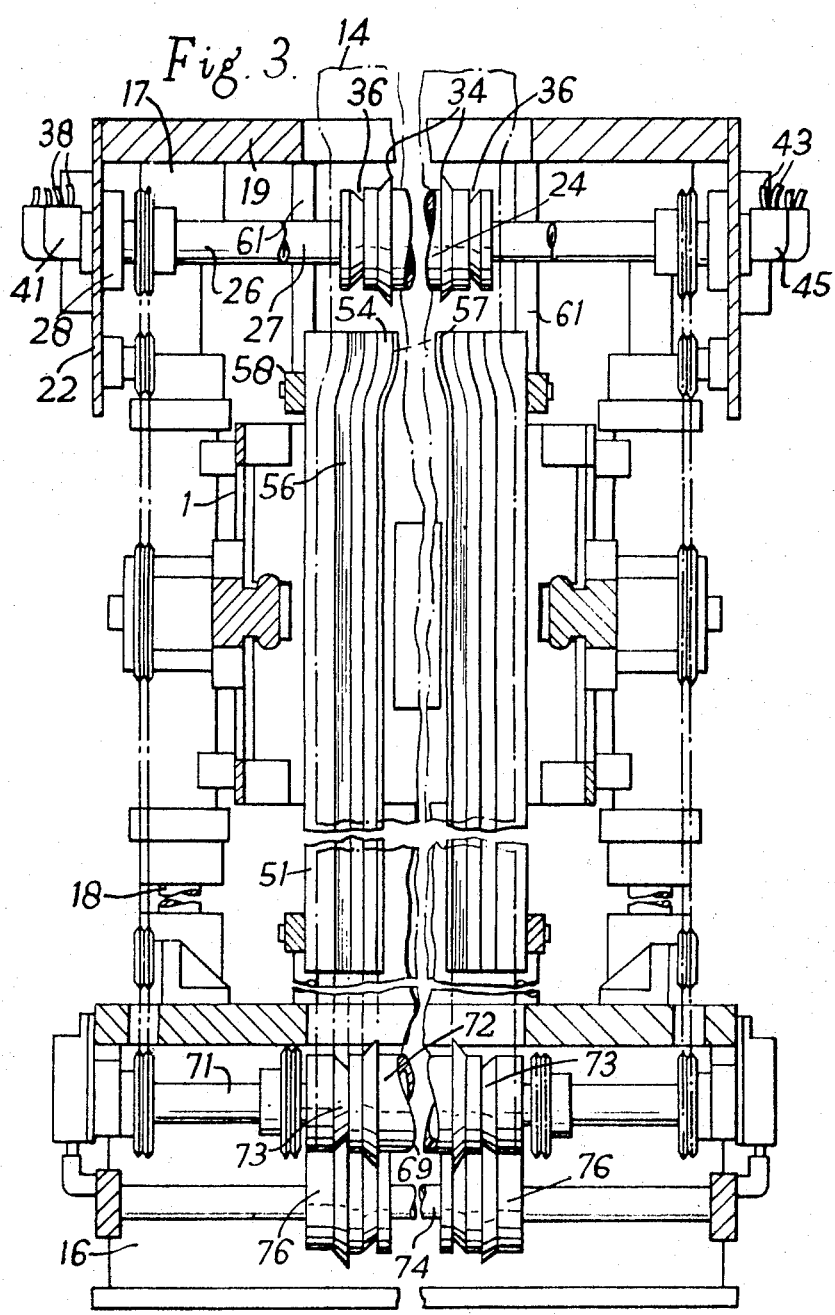

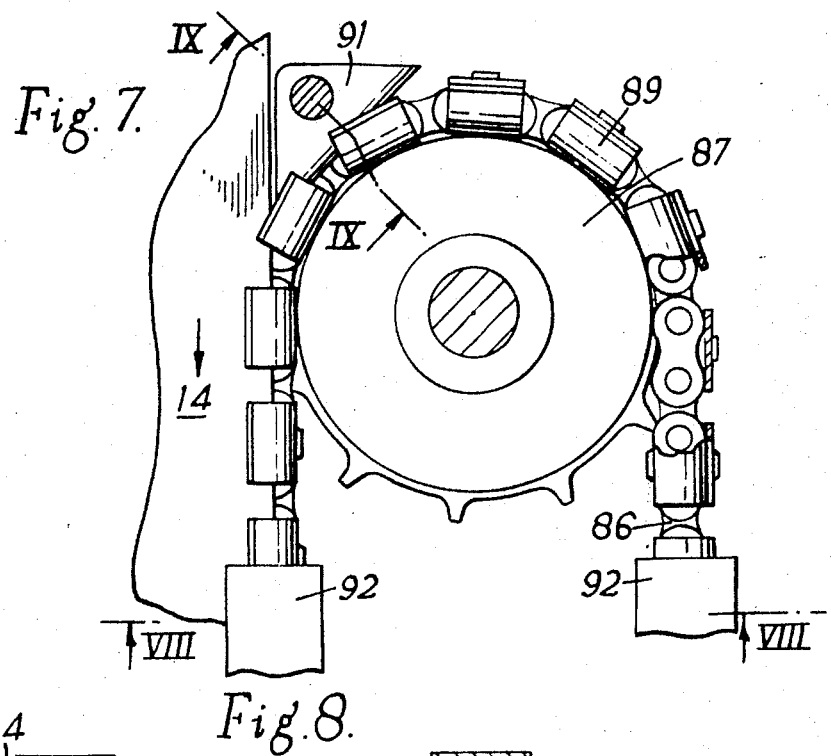
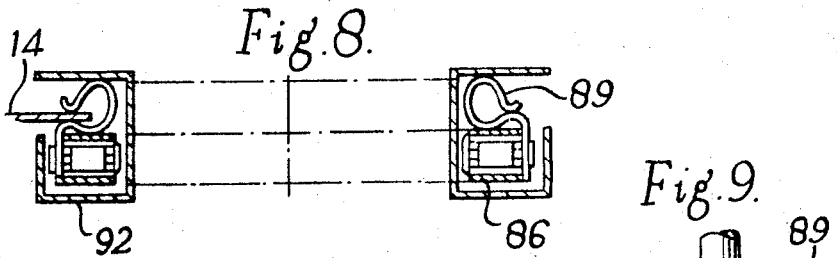
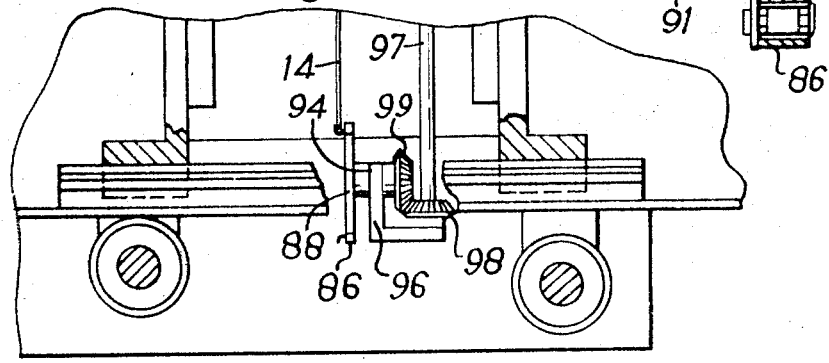

United States Patent Office 3,456,296
Patented July 22, 1969

3,456,296
APPARATUS FOR MOULDING ARTICLES FROM PLASTIC MATERIAL
Jack M. Schneider, Kingswood, Surrey, England, assignor to Calmec (Manufacturing) Limited, London, England
Filed Aug. 16, 1966, Ser. No. 572,832
Int. Cl. B29c *17/00*
U.S. Cl. 18—19                                    9 Claims

ABSTRACT OF THE DISCLOSURE

This invention relates to an apparatus for forming articles of plastic material wherein plastics material is driven along a predetermined path and articles are formed from the material by tool means which engage a section of material entering the path, form an article from the section while moving lengthwise of the path at the same rate as the material, and are then disengaged from the material and returned to their initial positions for engagement with a succeeding section. To inhibit lateral movement of the material, each side edge thereof is engaged by sheet holding means, which can be stationary guides providing channels along which deformed edges of the material are engaged or a series of clips which engage each side edge of the material and are mounted on chains for movement along the path at the same rate as the material.

---

According to the present invention, apparatus for forming articles from plastics material comprises tool means reciprocably mounted on an elongated supporting structure which defines a path for the material, means for continuously driving heated material along the path, means which are adapted to engage the continuously moving material at or near opposed edges thereof which extend longitudinally of the path and thereby to inhibit movement of these edges laterally of the said path, means for causing the tool means to engage and thereby effect a forming operation on a section of heated material travelling along the path, means for advancing the tool means along the path at a rate sensibly equal to the rate of travel of the material, means for releasing the tool means from the section after travel through a predetermined distance, whereby the section retains its formed shape, and means for returning the tool means along the path to their initial position for engagement with a succeeding section.

The apparatus may comprise means for deforming the material so as to form at or near each of the said opposed edges, a longitudinally extending portion which projects laterially from the said path, and guide means which provide, at or near each opposed edge, a channel of transverse section corresponding to the transverse section of one of the said portions, each portion being engaged within the associated channel during movement of the material along the path so that lateral movement of the portion is inhibited.

Alternatively, the apparatus may comprise a series of holding elements each having facing parts which are urged together by virtue of the inherent resilience of the element, the holding elements being so arranged that the material is engaged, at locations at or near each edge of the material and spaced longitudinally of the path, between facing parts of respective elements, and means for driving the engaged elements along the path at a rate sensibly equal to the rate of travel of the material.

The invention will now be described, by way of example, with reference to the accompanying drawings, in which:

FIGURE 2 is a side elevation of part of the apparatus of FIGURE 1;

FIGURE 3 is a view taken along the line III—III of FIGURE 2;

FIGURE 4 is a view taken along the line IV—IV of FIGURE 2;

FIGURE 5 is a scrap sectional view taken along the line V—V of FIGURE 2;

FIGURE 7 is an enlarged view of a part of the apparatus of FIGURE 6;

FIGURE 8 is a view taken along the line VIII—VIII of FIGURE 7;

FIGURE 9 is a view taken along the line IX—IX of FIGURE 7; and

FIGURE 10 is a scrap plan view of part of the apparatus of FIGURE 6.

Figure 1:
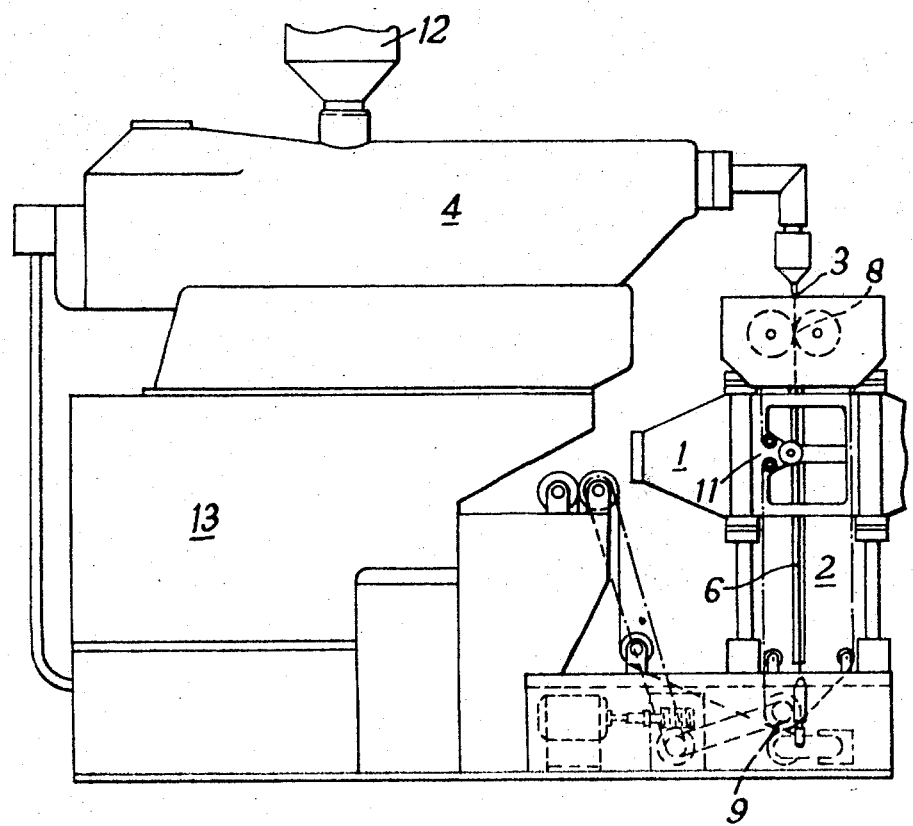
FIGURE 1 is a general arrangement view showing in side elevation an apparatus for forming articles from plastics material in accordance with the invention.

Referring to FIGURES 1 to 5 of the drawings, the apparatus for forming articles from sheet plastics material shown comprises a carriage 1 reciprocably mounted on an elongated supporting structure 2 which, when disposed close to the outlet 3 of an extrusion apparatus 4, provides a path 6 along which the carriage can be reciprocated towards and away from the said outlet, tool means 7 mounted on the carriage 1, means generally indicated at 8 and 9 for driving material emerging from the said outlet along the path provided by the supporting structure, hydraulically operated means on the carriage for causing the tool means to engage and thereby effect a forming operation on a section of heated material close to the said outlet, means generally indicated at 11 for advancing the carriage and the engaged tool means along the said path in a direction away from the said outlet and at a rate sensibly equal to the rate of supply of material therefrom, means on the carriage for releasing the tool means from the section after travel through a predetermined distance, whereby the section retains its formed shape, and means for rapidly returning the carriage along the path to its initial position for enagement of the tool means with a succeeding section of material.

Referring to FIGURE 1, the apparatus more specifically includes a conventional extrusion apparatus 4 having a heating chamber, a hopper 12 for the supply of powder plastics material to an inlet of the heating chamber, and a screw (not shown) for conveying heated material from the chamber and forcing the material through an extruding die at the outlet 3 of the apparatus to form a sheet 14. The extruding apparatus 4 is mounted on a framework 13 with the extruding die so arranged that the extruded sheet 14 is moving vertically downwardly as it emerges from the outlet 3 thereof.

Referring to FIGURES 2 to 5, the supporting structure 2 is upright, and when arranged beneath the outlet 3 of the extrusion apparatus, defines a vertically downwardly extending path 6 for the heated sheet 14 emerging therefrom. This supporting structure includes a substantial base 16 and a supporting head 17 which is mounted on the base, immediately below the outlet of the extrusion apparatus, by means of four upstanding pillars 18.

The head 17 of the supporting structure comprises a top plate 19 which is mounted on the upper ends of the pillars 18 and is formed with a central, rectangular aperture 21 for the downwardly moving sheet 14 of extruded material. Side plates 22 of the head 17 extend downwardly on opposed sides of the sheet 14, respectively, and provide support for the driving means 8.

The driving means 8 include upper driving rollers 23 and 24 which are respectively located on opposite sides of the sheet 14 and are mounted on parallel shafts 26 and 27, respectively. The shafts 26 and 27 are journalled in bearings supported by respective side plates 22, the housings 28 of the bearings associated with the shaft 26 being fixedly secured to respective side plates whilst the housings 29 of the bearings associated with shaft 27 are movable horizontally by air pressure operated means 31. The location of the housings 29 is adjusted so as to ensure that a minimum spacing slightly less than the thickness of sheet 14 emerging from the outlet 3 of the extrusion apparatus is provided between rollers 23 and 24.

Each of the upper driving rollers 23 and 24 includes a central section 32 of constant diameter and end sections 33 which, in co-operation with respective end sections of the other roller, are adapted to deform the longitudinally extending edges of the sheet 14. For this purpose each end section 33 of the rollers is formed with a flange 34 and a groove 36 which are both triangular in section and have the face thereof which is nearer to the central section 32 of the roller extending substantially normally of the axis thereof. Each flange 34 on a roller is at the same axial location as a groove 36 on the other roller and projects into that groove when the roller 24 is biassed into the operative position mentioned above.

Referring to FIGURE 4 of the drawings, the main central section 32 of the upper driving roller 23 is hollow and has a coil 37 in contact with the interior surface of its side wall. Oil for heating this central section is supplied to the coil 37 via conduits 38 which extend through the shaft 26 from a junction 41 at one end thereof.

The end sections 33 of the roller 23 are likewise hollow and are provided with respective coils 42 which contact the inner surfaces of the sections. Water for cooling the end sections 33 is supplied via conduits 43 which extend through shaft 26 from a junction 45 at the end of the shaft remote from the junction 41.

The central section of the upper driving roller 24 is likewise heated by oil supplied thereto via conduits (not shown) in shaft 27 and the end sections 33 of this roller are cooled by water which is also supplied via conduits (not shown) in the interior of the shaft 27.

The water conduits 43 for cooling the end sections 33 of roller 23 are at the end thereof remote from the water conduits associated with roller 24, however, and the oil conduits 38 are likewise at the end of roller 23 remote from the oil conduits associated with roller 24.

The upper driving rollers 23 and 24 draw sheet material downwardly from the outlet 3 of the extrusion apparatus 4 into the path 6. These rollers 23 and 24 are driven, by means hereinafter described, at a peripheral speed greater than the rate at which material emerges from the outlet 3 so that the sheet 14 tends to form a "waist" as it approaches the rollers. A sheet of desired thickness is formed by adjusting the spacing between the rollers 23 and 24 and their speed of rotation relative to the rate of supply of material from the extrusion apparatus 4.

In passing between the upper driving rollers 23 and 24 each longitudinally extending edge of the sheet 14 is gripped between facing end sections 33 of respective rollers and is thereby forced to assume the transverse section of the narrow channel between these end sections.

Upon emerging from the upper driving rollers 23 and 24 the main, central section of the sheet material is still in a heated, plastic condition but the edges of the sheet have been cooled sufficiently by the end sections of the rollers to retain the deformed shape impressed upon them by the end sections. As shown in FIGURE 5, the sheet emerging from rollers 23 and 24 is therefore formed, near to each edge, with two longitudinally extending portions 46 which project laterally from the path 6 in opposed directions, respectively. Each of these portions 46 is formed of two longitudinally extending, generally planar side parts 47 and 48, respectively, which are inclined outwardly from the path and are joined together at the edges thereof remote from the path. The side part 47 of each portion which is remote from the edge of the sheet 14 is disposed in a plane normal to the path 6.

Referring to FIGURES 2, 3 and 5, extending upwardly from the base 16 of the supporting structure 2 to a location a short distance below the upper driving rollers 23 and 24 are guide means 49 which serve to engage the deformed sections of the sheet 14 during its downward travel along the path 6. These guide means comprise, near to each edge of the sheet, two upstanding guide elements 51 and 52 which are disposed in opposite sides of the sheet, respectively, and are each formed with a channel 53 along which water is supplied for cooling purposes.

Each of the guide elements 51 and 52 has the surface thereof which faces the sheet 14 made of brass or coated with polytetrafluoroethylene. Formed in this surface is a longitudinally extending groove 54 and a longitudinally extending groove 56 the transverse sections of these ribs and grooves respectively corresponding to the transverse sections of the flanges 36 and grooves 34 on the upper driving rollers 23 and 24. With the guide elements 51 and 52 arranged in their operative positions the rib 54 on each element projects into the groove 56 of the associated element and the two elements are spaced apart in a direction laterally of the sheet by a distance slightly greater than the thickness of sheet 14. A narrow channel of transverse section corresponding to the transverse section of the deformed section of the sheet is therefore defined between the elements 51 and 52.

As shown in FIGURE 3, the guide elements 51 and 52 are upright over the major part of their height and the elements near to one edge of the sheet are spaced from those at the other edge by a distance greater than the spacing between the end sections 33 of an upper driving roller 23 or 24. Near to their upper ends, however, each pair of guide elements 51 and 52 are curved inwardly towards the elements at the opposite edge of the sheet and the uppermost part 57 of each element, which is again upright, is disposed vertically beneath and at the same horizontal location as the corresponding end section 33 of a driving roller.

Upon emerging from the space between facing end sections of respective driving rollers 23 and 24 each deformed edge of the sheet 14 is guided into the channel between a pair of facing guide elements 51 and 52. As the sheet is drawn downwardly between the upper parts of the guide means 49, by means hereinafter described, its opposed edges are forced further apart so that the sheet is stretched slightly and is held in tension during the subsequent forming operation.

Referring to FIGURES 2 to 5, for mounting the guide elements 51 and 52 on the supporting structure a pair of upper, horizontal supports 58 are provided a short distance below the upper driving rollers 23 and 24 and a pair of lower horizontal supports 59 are mounted on the base of the supporting structure.

The upper supports 58 extend normally of the plane of the sheet 14, at locations spaced outwardly of the sheet from respective opposed edges thereof, and are pendantly supported from the top plate 19 by brackets 61. Each guide element 52 at the front of the sheet 14 is fixedly secured to the associated support 58 by means of a bolt 62. Each of the guide elements 51 at the rear of the sheet is likewise secured to the associated support by means of a bolt 63 but in this case the bolt is engaged in a horizontal slot 64 in the support 58. The location of the upper end of each guide element 51 relative to the support 58 can therefore be varied, thereby varying the position of the element 51 relative to the forward guide element 52 to allow for sheets of different thicknesses.

At its lower end each guide element 52 at the front of the sheet is likewise fixedly secured to the lower support 59 by means of a bolt 66. Horizontal movement of the lower ends of the rear guide elements 51 is provided for by arranging for the bolt 67 which secures the element to the support to be engaged in a horizontal slot 68 in the support.

Sheet material is drawn downwardly from the upper driving rollers 23 and 24 by the lower driving means 9 in the base 16 of the supporting structure 2 (see FIGURES 2 and 3). These lower driving means 9 include a lower driving roller 69 on a shaft 71 arranged vertically below the upper driving roller 24 and having a wide central section 72 of constant diameter and end sections 73 corresponding to respective end sections 33 of roller 24. Beneath the lower driving roller 69 is a shaft 74 having, at each end thereof, a pulley 76 of cross section corresponding to the corresponding end section 33 of the upper driving roller 23. A sheet section emerging from the guide means 49 travels downwardly and then horizontally with each deformed edge section thereof engaged between an end section 73 of the lower driving roller 69 and one of the pulleys 76 and its main central section in engagement with the central section 72 of the lower driving roller 69.

The shaft 71 upon which lower driving roller 69 is mounted is driven from driving means (not shown) in the base 16 of the supporting structure 2. From the shaft 71 drive is transmitted to the upper driving rollers 23 and 24 by endless chains 77 respectively disposed on opposed sides of the supporting structure and each engaging a sprocket 78 on shaft 71 and a further sprocket 79 on the shaft 26 or 27 of the associated upper driving roller. On its downward run each chain also engaged a unidirectional clutch mechanism 81 on the carriage 1 which serves to ensure that downwards movement of the carriage is maintained at a rate sensibly equal to the rate of travel of the sheet 14 whilst allowing rapid upwards movement of the carriage at the end of a forming operation.

The lower driving roller 69 is driven at a rate slightly greater than that of the upper driving rollers 23 and 24 so that the sheet 14 is subjected to tensile forces in directions longitudinally thereof in addition to the above-mentioned forces across its width.

The tool means 7 on carriage 1 include tool elements which are disposed on respective opposite sides of the sheet 14 and are movable laterally of the material from retracted positions, in which they are spaced from the material, to article forming positions, in which they engage stop means (not shown) on the carriage. Associated with the tool means are cutting means in the form of knives (not shown) which are fixedly secured relative to one of the tool elements and are arranged to contact one surface of the sheet 14, along the periphery of each article formed in a sheet section, when the tool elements are in their engaged positions. The opposite surface of the sheet is contacted by the other tool element. At the end of a forming operation an increased pressure is applied to the tool elements, causing them to be urged together more strongly so that the knives are forced into engagement with facing parts of the opposed tool elements and, in so doing, pierce the sheet section and sever the formed articles therefrom.

The apparatus is provided with a hydraulic circuit and control apparatus which serves to ensure that movement of the tool elements into engagement with a heated section immediately beneath the head 17 of the supporting structure 2, movement of the carriage 1 and the engaged tool means 7 downwardly at a rate sensibly equal to the rate of descent of the sheet material, operation of the cutting means, withdrawal of the tool means from the sheet, and rapid return of the carriage to its upper position for engagement of the tool means with the succeeding section are effected in sequence and in a predetermined time relationship.

During a forming operation one of the tool elements is moved laterally into engagement with the sheet 14 and in so doing tends to draw opposed edges of the sheet inwardly towards one another. Engagement of the deformed portions 46 of the sheet 14 by the guide means 49 tends to inhibit this movement, however, and the sheet is therefore maintained in its correct position on the path 6 throughout the forming operation.

It will be appreciated that owing to the inherent flexibility of the material of sheet 14, even when chilled, there would be a tendency for the material to be drawn out from the guide means 49 if a single longitudinally extending, projecting portion only were formed at or near each edge of the sheet. Forming two projecting portions 46 and arranging that these are disposed on opposed sides of the sheet, respectively, substantially reduces the possibility of the material being dis-engaged from the guide means 49 in this manner. Resistance to movement of the deformed portions is also increased by forming the side part 47 of each projection which is remote from the edge of the sheet at right angles to the plane of the sheet.

As a result, the spacing between a facing pair of guide elements can be greater than would otherwise be possible, thereby reducing the chance of movement of the material along the path being impeded by the guide means.

The apparatus described above and illustrated in FIGURES 1 to 5 is particularly suitable for forming articles from polystyrene, acetate sheeting and butyrate-acetate sheeting, which can be deformed when hot and can then be chilled rapidly to retain their deformed shape.

The apparatus can also be adapted for forming articles from extruded plastics material of tubular section. For this purpose the wide central sections 32 of the upper driving rollers 23 and 24 are made of reduced diameter and the rollers are arranged so that a major portion of the material can pass between these sections of the rollers without being pressed flat. The tubular material is, however, gripped at two diametrically opposed locations thereon between end sections of respective rollers and at these locations the material is, of course, pressed flat and deformed in the manner described above.

The apparatus shown in FIGURES 6 to 10 of the drawings corresponds to parts of the apparatus shown in FIGURES 1 to 5 and like parts are given corresponding reference numerals. Broadly, the apparatus of FIGURES 6 to 10 comprises a carriage 1 reciprocably mounted on an elongated supporting structure 2 which, when disposed close to the outlet of an extrusion apparatus of the form shown in FIGURE 1, provides a path 6 along which the carriage can be reciprocated towards and away from the said outlet, tool means 7 mounted on the carriage, means generally indicated at 8 and 9 for driving material emerging from the said outlet along the path provided by the supporting structure, hydraulically operated means on the carriage for causing the tool means to engage and thereby effect a forming operation on a section of heated material close to the said outlet, means generally indicated at 11 for advancing the carriage and the engaged tool means along the said path in a direction away from the said outlet and at a rate sensibly equal to the rate of supply of material therefrom, means on the carriage for releasing the tool means from the section after travel through a predetermined distance, whereby the section retains its formed shape, and means for rapidly returning the carriage means along the path to its initial position for engagement of the tool means with a succeeding section of material.

Referring now to FIGURES 6 to 10, the driving means 8 and 9 of the present apparatus include a pair of upper driving rollers 82 and a pair of lower driving rollers 83 which are of constant diameter throughout their length. The edges of a sheet 14 from the extrusion apparatus are not therefore deformed by the upper driving rollers 82 and the sheet is flat as it emerges from these rollers and travels downwardly into the path defined by the supporting structure 2.

In this apparatus means, generally indicated at 84, are provided for engaging each longitudinally extending edge of the sheet 14 during its travel along the path defined by the supporting structure thereby inhibiting lateral movement of the edges during movement of the tool elements into engagement with the sheet.

These means 84 include, at each edge of the sheet 14, an endless chain 86 having two vertical runs which extend between chain wheels 87 and 88 respectively disposed below the upper driving rollers 82 and above the lower driving rollers 83. The chain wheels 87 and 88 are so arranged that each chain 86 lies in a plane which is parallel with the plane of the sheet 14 and has its downwardly moving run spaced a short distance away from a downwardly moving edge of the sheet.

Referring to FIGURES 7 to 9, secured to each link of each of the chains 86 is a clip 89 formed from resilient sheet metal bent at one end into the form of a U and adapted at its other end, which extends at right angles to one arm of the U, for securing to the chain. Each clip 89 is so arranged relative to the chain 86 that during the downwards run thereof the two arms of the U are disposed on respective opposed sides of the sheet 14 and an edge of the sheet is gripped between these arms.

For guiding the clips 89 into engagement with the sheet 14 a stationary guide plate 91 is disposed close to the upper chain wheel 87 and lies in a plane parallel with the plane of the sheet. As each clip 89 passes over the upper chain wheel 87 the arms of the U engage the guide plate 91 and are thereby forced apart so that the clip continues its travel round the chain wheel 87 with these arms in engagement with respective opposed surfaces of the plate 91. The guide plate 91 is so arranged that the two arms of a clip 89 dis-engage therefrom at the beginning of the downward run of the chain 86 and, upon dis-engagement, spring together by virtue of the inherent resilience of the clip material and grip the edge of the sheet material.

During its upward and downward runs each chain 86, and the clips 89 secured thereto, is disposed within a casing 92.

The upper chain wheel 87 at each edge of the sheet 14 is rotatably mounted on the supporting structure.

Figure 6:
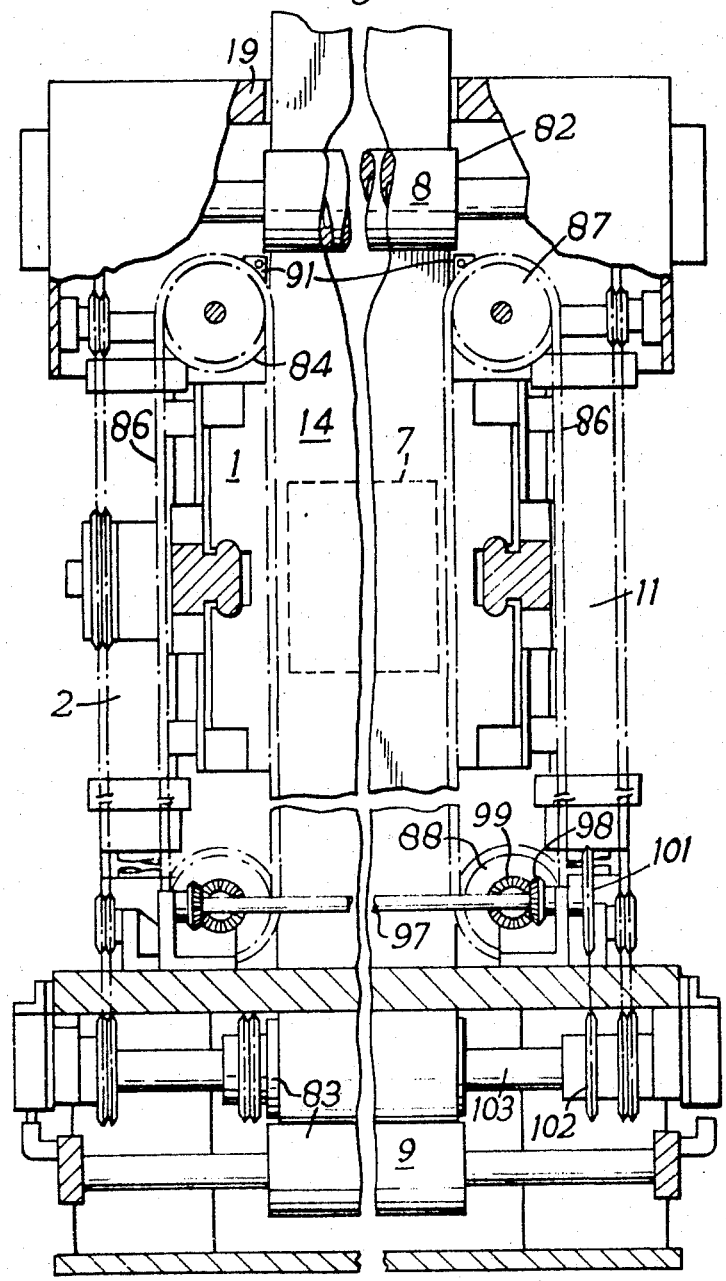
FIGURE 6 is a front elevation of a second apparatus according to the invention.

Referring to FIGURES 6 and 10, each of the lower chain wheels 88 is secured to a spindle 94 which is journalled in bearings in a horizontal support member 96 at the front of the sheet 14. A horizontal shaft 97 extends parallel with the sheet 14 and secured to this shaft 97 are two bevel gears 98 which engage bevel gears 99 respectively secured to spindles 94 at the ends of the spindles remote from the chain wheels 88. At one end of the shaft 97 is a chain wheel 101 which is driven from a chain wheel 102 on the shaft 103 of one of the lower driving rollers 83. Drive is therefore transmitted from the shaft 103 to chains 86 via chain wheels 102 and 101, shaft 97, bevel gears 98 and 99, and chain wheels 88.

In operation of the apparatus of FIGURES 6 to 10 the chains 86 at each edge of the sheet 14 are driven at a rate corresponding to the rate at which sheet material is driven along the path between the upper and lower driving rollers 82 and 83, respectively, of the apparatus. Accordingly, during its travel downwards in engagement with the edge of the sheet 14 each clip 89 is travelling at the same rate as the sheet and exerts only a very slight tension on the sheet in directions longitudinally thereof. On the other hand, engagement of the clips 89 with the sheet 14 serves to prevent the edges of the sheet from being drawn laterally of the sheet when the tool elements are moved into their article forming positions.

The apparatus of FIGURES 6 to 10 is suitable for forming articles from polyethylene, polypropylene or polyvinylchloride materials, which do not chill as readily as the materials mentioned above in connection with the apparatus of FIGURES 1 to 5.

The apparatus of FIGURES 6 to 10 can also be adapted for forming articles from extruded material of tubular section by arranging that the material is gripped at two diametrically opposed locations only as it is drawn downwardly by the upper driving rollers. The clips 89 are then arranged to engage the material at these locations during its travel along the path defined by the supporting structure.

It will be appreciated that apparatus according to the invention can be used for forming articles from preformed sheet supplied from a roll rather than material extruded from the outlet of an extrusion apparatus.

I claim:

1. Apparatus for forming articles from plastics material comprising tool means reciprocably mounted on an elongated supporting structure which defines a path for the material, supply means for supplying a substantially flat sheet of heated material toward said path, means for continuously driving heated material along the path, means disposed in spaced relation to said supply means for deforming the supplied material entering the path so as to form adjacent each longitudinal side edge of the material, a longitudinally extending portion which projects in a lateral direction relative to the said path, stationary guide means which provide, adjacent each longitudinal side edge of the material, a channel which extends longitudinally of the path and within which the adjacent, laterally projecting portion of the material is engaged without sticking during movement thereof along the path, whereby movement of the portion laterally of the path is inhibited, means for causing the tool means to engage and thereby effect a forming operation on a section of heated material travelling along the path, means for advancing the tool means along the path at a rate sensibly equal to the rate of travel of the material, means for releasing the tool means from the section after travel through a predetermined distance, whereby the section retains its formed shape, and means for returning the tool means along the path to their initial position for engagement with a succeeding section.

2. Apparatus as set forth in claim 1, including means for deforming the material so as to form, adjacent each of the said opposed edges, two longitudinally extending portions which project laterally, and in opposed directions, respectively, from the said path, and guide means which provide, adjacent each opposed edge, a channel of transverse section corresponding to the transverse section of that part of the material in which the two projecting portions are formed.

3. Apparatus as set forth in claim 1 wherein each of the said portions of the material is formed of two longitudinally extending, generally planar side parts which are inclined outwardly from the said path and are joined along the edges thereof remote from the path.

4. Apparatus as set forth in claim 3 wherein the side part of each portion which is remote from the edge of the material is disposed in a plane substantially normal to the said path.

5. Apparatus as set forth in claim 1 wherein the spacing between the guide means adjacent one edge of the material and the guide means adjacent the opposed edge thereof increases with distance into the path over an initial section of the said path, whereby in travelling along this initial section of the path opposed edges of the sheet are caused to move further apart and the material is thereby subjected to tensional forces.

6. Apparatus as set forth in claim 1 including a pair of cooperating roller elements between which the material travels at the entrance to the said path and which are so arranged that the material is gripped, adjacent each edge thereof, between shaped end sections of respective roller elements, the shaping of the end sections being such that material emerging from the roller elements is formed with the said longitudinally extending portions.

7. Apparatus as set forth in claim 6 wherein the said roller elements serve to draw the plastics material into the said path, each roller element having a central section which is heated so that a central part of the material which is engaged by that section enters the path in a heated condition suitable for forming while the end sections of each roller element are cooled so that the material retains the deformed shape impressed thereupon by the end sections.

8. Apparatus as set forth in claim 1 wherein each guide means comprises facing guide elements between which the channel is defined and the lateral spacing between the facing elements is adjustable, whereby the width of the channel can be adjusted to accommodate material of different thicknesses.

9. Apparatus according to claim 1 wherein each guide means has a surface which is composed of a material selected from the group consisting of brass and polytetrafluoroethylene.

References Cited

UNITED STATES PATENTS

| 3,063,090 | 11/1962 | Koppehele | 18—1 |
| 3,124,834 | 3/1964 | Vandierendoneck | 18—1 |
| 3,132,375 | 5/1964 | Koppehele | 18—1 |
| 2,490,781 | 12/1949 | Cloud. | |
| 2,918,696 | 12/1959 | Bottoms et al. | |
| 2,967,328 | 1/1961 | Shelby et al. | |
| 3,055,048 | 9/1962 | Koppehele. | |
| 3,063,090 | 11/1962 | Koppehele. | |
| 3,081,491 | 3/1963 | Black. | |
| 3,110,927 | 11/1963 | Koppehele et al. | |
| 3,114,929 | 12/1963 | Zygan et al. | |
| 3,175,245 | 3/1965 | Kreeft et al. | |
| 3,228,066 | 1/1966 | Rippstein. | |
| 3,271,816 | 9/1966 | Schneider. | |

FOREIGN PATENTS

| 780,590 | 8/1957 | Great Britain. |

WILLIAM J. STEPHENSON, Primary Examiner

U.S. Cl. X.R.

18—1